United States Patent [19]

Scull et al.

[11] Patent Number: 4,554,141

[45] Date of Patent: Nov. 19, 1985

[54] GAS STREAM PURIFICATION

[75] Inventors: Herbert M. Scull, Baton Rouge; Sebastian M. Laurent, Greenwell Springs, both of La.

[73] Assignee: Ethyl Corporation, Richmond, Va.

[21] Appl. No.: 609,812

[22] Filed: May 14, 1984

[51] Int. Cl.$^4$ .................. C10H 23/00; B01J 8/00; C01B 33/04
[52] U.S. Cl. .................................................. 423/245
[58] Field of Search ........................... 423/245 R, 347

[56] References Cited

U.S. PATENT DOCUMENTS

| | | | |
|---|---|---|---|
| 3,019,087 | 1/1962 | Jacob et al. | 423/347 X |
| 3,031,268 | 4/1962 | Shoemaker | 423/347 |
| 4,099,936 | 7/1978 | Tarancon | 423/347 X |
| 4,340,574 | 7/1982 | Coleman | 423/347 |

FOREIGN PATENT DOCUMENTS

| | | | |
|---|---|---|---|
| 2507864 | 8/1975 | Fed. Rep. of Germany | 423/347 |
| 58-069715 | 4/1983 | Japan | 423/347 |

*Primary Examiner*—Paul F. Shaver
*Attorney, Agent, or Firm*—Donald L. Johnson; John F. Sieberth; John F. Hunt

[57] ABSTRACT

A process for the removal of ethylene from silane. Hydrocarbon-contaminated silane is preferably first distilled in a conventional distillation column to remove hydrocarbons boiling higher and lower than silane. Ethylene is removed by passing the silane stream through a column of zeolite, preferably zeolite A having a 4 Angstrom micropore. The 4 Angstrom zeolite A has a high capacity for ethylene and is readily regenerated.

19 Claims, No Drawings

GAS STREAM PURIFICATION

BACKGROUND OF THE INVENTION

1. Field of the Invention

The present invention relates in general to the purification of a stream or volume of gas and in particular to the use of zeolites for the removal of hydrocarbons, particularly ethylene, from silane gas.

2. Description of the Prior Art

Silane is an important gas for the preparation of silicon for semiconductor and photovoltaic applications. The purity of the silicon, especially for semiconductor applications, is of great importance for providing proper electrical properties in the products formed from the silicon. In turn, the purity of the silane precursor gas which may be used by any of various methods to provide silicon, is also critical. Thus, there exists a need for processes to provide silicon of such purity that it contains as few as 100 parts per billion atoms carbon and less than one part per billion of electrically active contaminants such as boron, arsenic, phosphorus, etc.

Carbon has been found to be a contaminant which detracts from the electrical properties of otherwise pure silicon and in turn disrupts the proper functioning of devices made from the silicon. Thus, the removal of carbon contamination to a low level is very important and in turn, the purification of a precursor gas for deposition of silicon to a level approaching that is also important.

Zeolites are crystalline, hydrated aluminosilicates of alkali and alkaline earth cations, having infinite, three-dimensional structures. The cations of the zeolites so formed may be exchanged for other cations, even $NH^+$, such as by acid or other treatment.

Zeolites consist basically of a three-dimensional framework of $SiO_4$ and $AlO_4$ tetrahedra. The tetrahedra are crosslinked by the sharing of oxygen atoms so that the ratio of oxygen atoms to the total of the aluminum and silicon atoms is equal to two [or oxygen/(Al+Si)=2]. The electrovalence of each tetrahedra containing aluminum is balanced by the inclusion in the crystal of a cation, for example, a sodium ion. This balance may be expressed by the formula Al/Na=1. The spaces between the tetrahedra are occupied by water molecules prior to dehydration.

Zeolite A is one of the more common of the synthetic zeolites and is the type of zeolite with which most of our work on the present invention was carried out.

Zeolite A may be distinguished from other zeolites and silicates on the basis of their composition and X-ray powder diffraction patterns and certain physical characteristics. The X-ray patterns for these zeolites are described below. The composition and density are among the characteristics which have been found to be important in identifying these zeolites.

The basic formula for all crystalline sodium zeolites may be represented as follows:

$$Na_2O.Al_2O_3.xSiO_2.yH_2O.$$

In general, a particular crystalline zeolite will have values for "x" and "y" that fall in a definite range. The value "x" for a particular zeolite will vary somewhat since the aluminum atoms and the silicon atoms occupy essentially equivalent positions in the lattice. Minor variations in the relative number of these atoms do not significantly alter the crystal structure or physical properties of the zeolite. For zeolite A, the "x" value normally falls within the range 1.85±0.5.

The value for "y" is not necessarily an invariant for all samples of zeolites. This is true because various exchangeable ions are of different size, and, since there is no major change in the crystal lattice dimensions upon ion exchange, the space available in the pores of the zeolite to accommodate water molecules varies.

The average value for "y" for zeolite A is 5.1. The formula for zeolite A may be written as follows:

$$1.0\pm0.2Na_2O.Al_2O_3.1.85\pm0.5SiO_2.yH_2O.$$

In the formula, "y" may be any value up to 6.

An ideal zeolite A has the following formula:

$$(NaAlSiO_4)_{12}.27H_2O$$

Among the ways of identifying specific zeolites and distinguishing them from other zeolites and other crystalline substances, the X-ray powder diffraction pattern has been found to be a useful tool. In obtaining the X-ray powder diffraction patterns, standard techniques are employed. The radiation is the $K_\alpha$ doublet of copper and a Geiger counter spectrometer with a strip chart pen recorder is used. The peak heights, I, and the positions as a function of $2\theta$ where $\theta$ is the Bragg angle, are read from a spectrometer chart. From these, the relative intensities, $100\ I/I_o$, where $I_o$ is the intensity of the strongest line or peak and d the interplanar spacing in angstroms corresponding to the recorded lines are calculated.

X-ray powder diffraction data for a sodium zeolite A are given in Table I.

TABLE I

| X-RAY DIFFRACTION PATTERN FOR ZEOLITE A | | |
|---|---|---|
| $h^2 + k^2 + l^2$ | d (Å) | $\dfrac{100\ I}{I_o}$ |
| 1 | 12.29 | 100 |
| 2 | 8.71 | 70 |
| 3 | 7.11 | 35 |
| 4 | 6.15 | 2 |
| 5 | 5.51 | 25 |
| 6 | 5.03 | 2 |
| 8 | 4.36 | 6 |
| 9 | 4.107 | 35 |
| 10 | 3.895 | 2 |
| 11 | 3.714 | 50 |
| 13 | 3.417 | 16 |
| 14 | 3.293 | 45 |
| 16 | 3.078 | 2 |
| 17 | 2.987 | 55 |
| 18 | 2.904 | 10 |
| 20 | 2.754 | 12 |
| 21 | 2.688 | 4 |
| 22 | 2.626 | 20 |
| 24 | 2.515 | 6 |
| 25 | 2.464 | 4 |
| 26 | 2.414 | 1 |
| 27 | 2.371 | 3 |
| 29 | 2.289 | 1 |
| 30 | 2.249 | 3 |
| 32 | 2.177 | 7 |
| 33 | 2.144 | 10 |
| 34 | 2.113 | 3 |
| 35 | 2.083 | 4 |
| 36 | 2.053 | 9 |
| 41 | 1.924 | 7 |
| 42 | 1.901 | 4 |
| 44 | 2.858 | 2 |
| 45 | 1.837 | 3 |
| 49 | 1.759 | 2 |
| 50 | 1.743 | 13 |
| 53 | 1.692 | 6 |

TABLE I-continued

| X-RAY DIFFRACTION PATTERN FOR ZEOLITE A | | |
|---|---|---|
| $h^2 + k^2 + l^2$ | d (Å) | $\frac{100\ I}{I_o}$ |
| 54 | 1.676 | 2 |
| 55 | 1.661 | 2 |
| 57 | 1.632 | 4 |
| 59 | 1.604 | 6 |

The more significant d values for zeolite A are given in Table II.

TABLE II

| MOST SIGNIFICANT d VALUES FOR ZEOLITE A | |
|---|---|
| d Value of Reflection in Å | ± |
| 12.2 | 0.2 |
| 8.7 | 0.2 |
| 7.10 | 0.15 |
| 5.50 | 0.10 |
| 4.10 | 0.10 |
| 3.70 | 0.07 |
| 3.40 | 0.06 |
| 3.29 | 0.05 |
| 2.98 | 0.05 |
| 2.62 | 0.05 |

Occasionally, additional lines not belonging to the pattern for the zeolite appear in a pattern along with the X-ray lines characteristic of that zeolite. This is an indication that one or more additional crystalline materials are mixed with the zeolite in the sample being tested. Small changes in line positions may also occur under these conditions. Such changes in no way hinder the identification of the X-ray patterns as belonging to the specific zeolite.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the lattice for a zeolite, are not to exclude those materials which, due to some variable mentioned or otherwise known to those skilled in the art, fail to show all of the lines, or show a few extra ones that are permissible in the cubic system of that zeolite, or show a slight shift in position of the lines, so as to give a slightly larger or smaller lattice parameter.

A simpler test described in "American Mineralogist," Vol. 28, page 545, 1943, permits a quick check of the silicon to aluminum ratio of the zeolite. According to the description of the test, zeolite minerals with a three-dimensional network that contains aluminum and silicon atoms in an atomic ratio of $Al/Si = \frac{2}{3} = 0.67$, or greater, produce a gel when treated with hydrochloric acid. Zeolites having smaller aluminum to silicon ratios disintegrate in the presence of hydrochloric acid and precipitate silica. These tests were developed with natural zeolites and may vary slightly when applied to synthetic types.

U.S. Pat. No. 2,882,243 describes a process for making zeolite A comprising preparing a sodium-aluminum-silicate water mixture having an $SiO_2:Al_2O_3$ mole ratio of from 0.5:1 to 1.5:1, and $Na_2O/SiO_2$ mole ratio of from 0.8:1 to 3:1, and an $H_2O/Na_2O$ mole ratio of from 35:1 to 200:1, maintaining the mixture at a temperature of from 20° C. to 175° C. until zeolite A is formed, and separating the zeolite A from the mother liquor.

Zeolites are useful as molecular sieves and as sequestering agents for calcium and magnesium cations. They are particularly useful in detergent or washing compositions.

SUMMARY OF THE INVENTION

The present invention relates to a method of purifying silane, particularly the removal of ethylene from silane. The silane stream is optionally distilled to remove hydrocarbons contained in the stream; however, ethylene boils at very nearly the same temperature as silane and exhibits azeotropic behavior at low concentrations of ethylene and thus is not removed by conventional distillation. Therefore, the present invention provides a process for the removal of ethylene from silane by passing the stream through a zeolite material and then recovering the purified silane.

The invention includes all crystalline aluminosilicates which will permit the capture of ethylene from a predominantly silane stream without capturing any substantial portion of the silane.

The present invention is a process for the purification of silane, said process comprising contacting silane contaminated with ethylene with a zeolite which has a pore structure that selectively removes ethylene and recovering the purified silane.

The present invention is also a process for the removal of hydrocarbon contaminants from silane said process comprising the steps of:

(a) distilling silane containing hydrocarbon contaminants including ethylene so as to remove hydrocarbons other than ethylene;

(b) passing the distilled silane through a zeolite having a pore structure that selectively removes ethylene; and (c) recovering the purified silane.

DESCRIPTION OF THE PREFERRED EMBODIMENT

Applicants have found that certain sources of silane and various methods of producing silane may produce a silane product which contains various hydrocarbon contaminants. While many of the hydrocarbons may be readily removed by a distillation process, the removal of ethylene is particularly difficult. For example, methane boils at −161.49° C., well below the boiling point of silane which is −111.8° C. Conversely, ethane boils at −88.63° C. well above the boiling point of silane. Similarly, n-butane boils at −0.5° C. also well above the boiling point of silane. Ethylene boils at −104° C. near the boiling point of silane and its removal by distillation is therefore theoretically possible.

However, vapor liquid equilibrium data and distillation data indicate that at low ethylene concentrations, ethylene in silane exhibits azeotropic behavior which makes separation by distillation impractical.

Applicants have discovered that zeolites are suitable for the separation of ethylene contaminant from silane. While a preferred embodiment is described herein, various synthetic and naturally occurring materials are suitable for the invention. Other suitable synthetic zeolites include the zeolites of types X, Y, and F and the family of ZSM zeolites. The ZSM zeolites are described in U.S. Pat. Nos. 3,702,886; 3,709,979; 3,832,449;

4,076,842; 4,016,245; 4,046,859 and European Patent Application No. 80/300,463 all of which are incorporated herein by reference in their entirety. Among the natural materials are chabazite, levynite, gmelinite, phillipsite, mordenite, clinoptilolite, and others.

Some of these other zeolites will separate ethylene from silane by a mechanism different than that described below for zeolites of the A type. These mechanisms include the differences between the bonding of a polar versus a nonpolar molecule with a solid surface. These materials may admit both silane and ethylene molecules into their internal porous structure but only sorb or retain the ethylene. Other zeolite materials may sorb and retain both ethylene and silane. The invention includes such materials so long as silane is purified of ethylene even though a small amount of silane may be lost.

Zeolites in general react with silane by a chemisorption mechanism that occurs at 30° C. or higher. Such reaction tends to decompose the silane by a progressive removal of hydrogen. Such decomposition would be detrimental to the practice of this invention. Although the decomposition of silane at or above 30° C. is detrimental, we find that in the practice of our invention below 30° C., the loss of silane is negligible.

In a preferred embodiment zeolite A's having a micropore size of about 4 Angstroms are used to separate ethylene from silane. The zeolite A is preferably of the sodium cation type where substantially all of the cation positions are filled by sodium. This has a micropore structure permitting the capture of ethylene while preventing the entry of silane into its pore structure. The sodium cation form has a sodium cation sitting inside the eight-membered cyclic face of oxygens at the opening to the adsorption cavity in the crystal structure of the zeolite. The 5 Angstrom zeolites of the A type are not effective because the sodium cation and a second sodium cation from another face have been replaced by a calcium cation which sits off to one side of the face of the zeolite structure, thereby opening the faces somewhat, allowing the somewhat larger silane molecules to be captured (in addition to ethylene). Thus the 4 Angstrom zeolite A is selective for the present process. A stream of silane gas may be passed over a bed or through a column of small diameter extrudates, cylinders, or other structures of the zeolite A material so as to remove the ethylene while allowing the silane gas to pass through the bed, column, or mass.

Applicants have found that one part by weight of zeolite is sufficient to remove significant ethylene contamination from at least 40 parts by weight silane having an ethylene contamination of as much as 10 ppm by weight. Applicants have not been able to determine the exact amount of ethylene capacity which may be removed from silane by the zeolite A material but any process within that capability is within the scope of this embodiment of the invention.

Applicants have found that the detection limit for ethylene in silane by vapor phase chromatography methods is about 25 parts by weight ethylene per billion parts by weight silane. Furthermore, Applicants have found that streams containing as much as 100 ppm ethylene or more are readily purified by using a 4 Angstrom zeolite A in the amount of 1 part by weight zeolite per 40 parts by weight silane such that the silane is purified below the detection limit of 25 parts per billion. Advantageously, the silane stream may then be passed through a second column, bed, or other mass of the zeolite A for further purification which may or may not be detectable by conventional methods.

A particularly preferred embodiment of the invention is the removal of hydrocarbons other than ethylene by conventional distillation techniques followed by removal of ethylene with a zeolite, preferably a 4 Angstrom zeolite A. The 4 Angstrom zeolite A is preferred most because it also tends to sorb ethane, although this preempts some of the capacity of the zeolite (for ethylene). Also, methane does not appear to be captured by the 4 Angstrom zeolites of the invention, thus making its removal by distillation desirable.

Silane tends to react with aluminosilicates above 30° C. or higher and the process is therefore preferably conducted at or below about 30° C.

The process of the invention is illustrated in the non-limiting example below of the best mode of the invention now known to Applicants.

EXAMPLE 1

Silane gas was produced by reaction of sodium aluminum tetrahydride and silicon tetrafluoride in dimethoxyethane. The silane is synthesized at from about 75° F. to 130° F. The hydrocarbon contaminants vary from about 250–3000 ppm methane, 1–10 ppm ethylene, 80–200 ppm ethane, and 3–100 ppm n-butane. The ethylene contamination both before and after conventional distillation is usually about 5–10 ppm. A large volume of silane was distilled at low temperatures and was effective in reducing all of the hydrocarbons to less than 1 ppm except for ethylene which was the same concentration level into and out of the column.

Two two-inch columns were filled with about 25 pounds each of 1/16 inch extrudates of 4 Angstrom zeolite A (Union Carbide 4A Molecular Sieve zeolite A). The extrudates are pellet like pieces of the zeolite formed with a clay-type cementitious (but otherwise innocuous) binder. The columns are about 20 ft. high and the stream of silane containing about 5 ppm (by weight) ethylene was passed through the two columns in series at the rate of about 6.0 lbs./hr. A sample of the silane after the columns was analyzed for hydrocarbons. Analysis of the silane stream between the two columns indicated that the ethylene was below the detection limit of 0.025 ppm.

After nearly 1000 lbs. of ethylene-contaminated silane had passed through the columns, both were still effective for the removal of ethylene.

The columns were regenerated with steam at 150° C. and dried. Their continued use for ethylene removal was again excellent.

The columns also lower the ethane level from about 0.5 ppm to at or below the detection limit.

EXAMPLE 2

In laboratory equipment, distilled silane containing 5–10 ppm ethylene was separately passed through four ¼ inch packed stainless steel columns (tubing) containing (A) silver zeolite X, (B) cadmium zeolite X, (C) hydrogen mordenite, and (D) potassium zeolite A. The columns were packed with zeolites in granular form. Analysis of the silane from each of columns (A)–(D) showed that the zeolites removed ethylene to below the detection limit of 25 ppb. The zeolite X's (A and B) and the mordenite (C) also adsorbed some measurable but not significant amounts of silane. Silver zeolite A, calcium zeolite A, sodium zeolite X, activated carbon, and sodium mordenite were not effective to separate ethylene from silane. While both of the silver zeolites underwent an exothermic reaction to produce silver metal, the silver zeolite X was nevertheless effective.

The separation of ethylene from silane also containing significant portions of other hydrocarbons is also effective although the other contaminants may seriously reduce the capacity of the zeolite. For example, a small column of cadmium zeolite X was saturated after treating about 10 grams of crude silane/gram zeolite. The crude silane contained 125 ppm methane, 53 ppm ethane, 67 ppm ethylene, and 3 ppm n-butane.

Certain aspects and conditions of the inventive process may be varied without departing from the scope or spirit of the invention as defined by the appended claims.

We claim:

1. A process for the purification of silane, said process comprising contacting silane contaminated with ethylene with a zeolite which has a pore structure that selectively removes ethylene and recovering the purified silane.

2. The process of claim 1 wherein said silane contains about 1–10 ppm ethylene and the silane is contacted with a zeolite so as to lower the ethylene to less than 25 ppb.

3. The process of claim 1 comprising passing silane contaminated with ethylene through a zeolite A having a micropore of about 4 Angstroms and recovering the purified silane.

4. The process of claim 3 wherein said zeolite A is of the sodium cation form.

5. The process of claim 3 wherein about one part or less by weight zeolite A is used per 40 parts by weight silane.

6. The process of claim 3 wherein said silane contains at least about 25 parts by weight ethylene per billion parts by weight silane.

7. The process of claim 3 wherein said silane contaminated with ethylene also contains another hydrocarbon.

8. The process of claim 7 wherein said hydrocarbon is methane or ethane.

9. The process of claim 3 wherein said process is carried out in a column of said zeolite A.

10. The process of claim 3 wherein said zeolite A is in the form of small diameter extrudate.

11. The process of claim 3 wherein the ethylene contaminant is present in the silane at the level of up to about 10 ppm by weight.

12. The process of claim 1 wherein the process is carried out at a temperature below about 30° C.

13. A process for the removal of hydrocarbon contaminants from silane said process comprising the steps of:
   (a) distilling silane contaminated with hydrocarbon contaminants including ethylene so as to remove hydrocarbons other than ethylene;
   (b) passing the distilled silane through a zeolite having a pore structure that selectively removes ethylene; and
   (c) recovering the purified silane.

14. The process of claim 13 wherein said hydrocarbon contaminants include methane or ethane.

15. The process of claim 13 wherein said zeolite is a zeolite A having a micropore structure of about 4 Angstroms.

16. The process of claim 15 wherein said zeolite A is a sodium cation zeolite A.

17. The process of claim 15 wherein at least one part by weight zeolite A is used per 40 parts by weight distilled silane.

18. The process of claim 15 wherein said zeolite A is in the form of small diameter extrudate.

19. The process of claim 13 wherein said process is carried out at a temperature below about 30° C.

* * * * *

UNITED STATES PATENT AND TRADEMARK OFFICE
CERTIFICATE OF CORRECTION

PATENT NO. : 4,554,141

DATED : NOVEMBER 19, 1985

INVENTOR(S) : HERBERT M. SCULL, ET AL.

It is certified that error appears in the above-identified patent and that said Letters Patent is hereby corrected as shown below:

Column 1, line 34, reads "$NH^+$" and should read -- $NH_4^+$ --.

Signed and Sealed this

Eighteenth Day of February 1986

[SEAL]

Attest:

DONALD J. QUIGG

Attesting Officer

Commissioner of Patents and Trademarks